April 14, 1936. L. WEISS 2,037,186
APPARATUS FOR MAKING CANDLE HOLDERS
Filed June 29, 1934 3 Sheets-Sheet 1
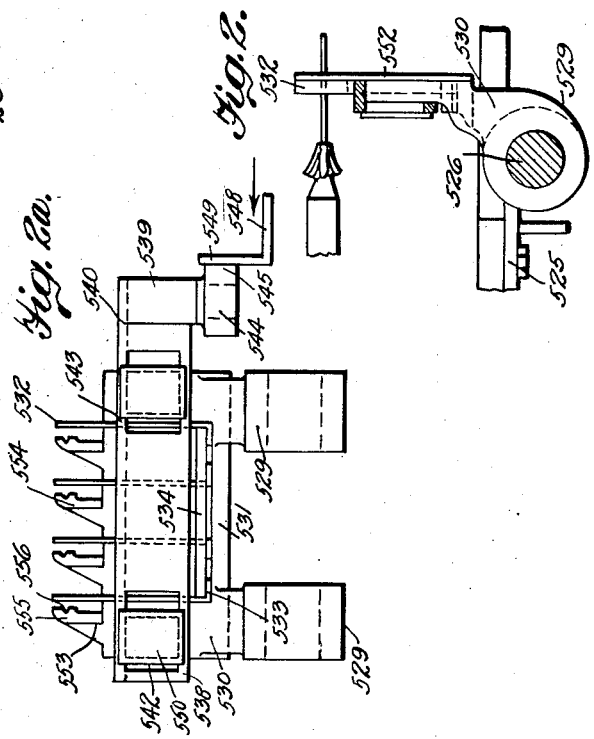
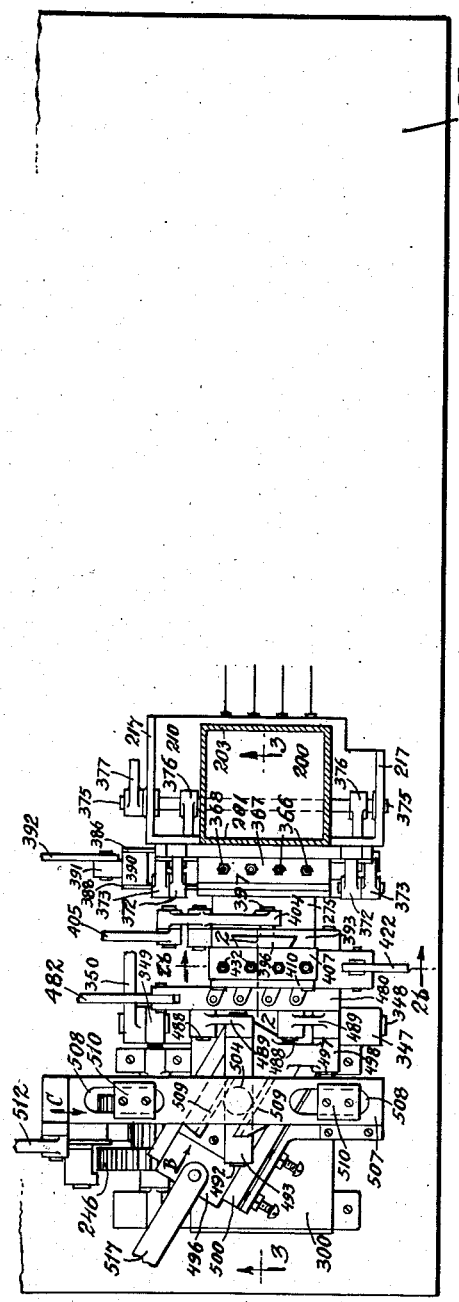
INVENTOR
*LEO WEISS*
BY *A A de Bonneville*
ATTORNEY April 14, 1936.                    L. WEISS                    2,037,186
                    APPARATUS FOR MAKING CANDLE HOLDERS
                    Filed June 29, 1934        3 Sheets-Sheet 2
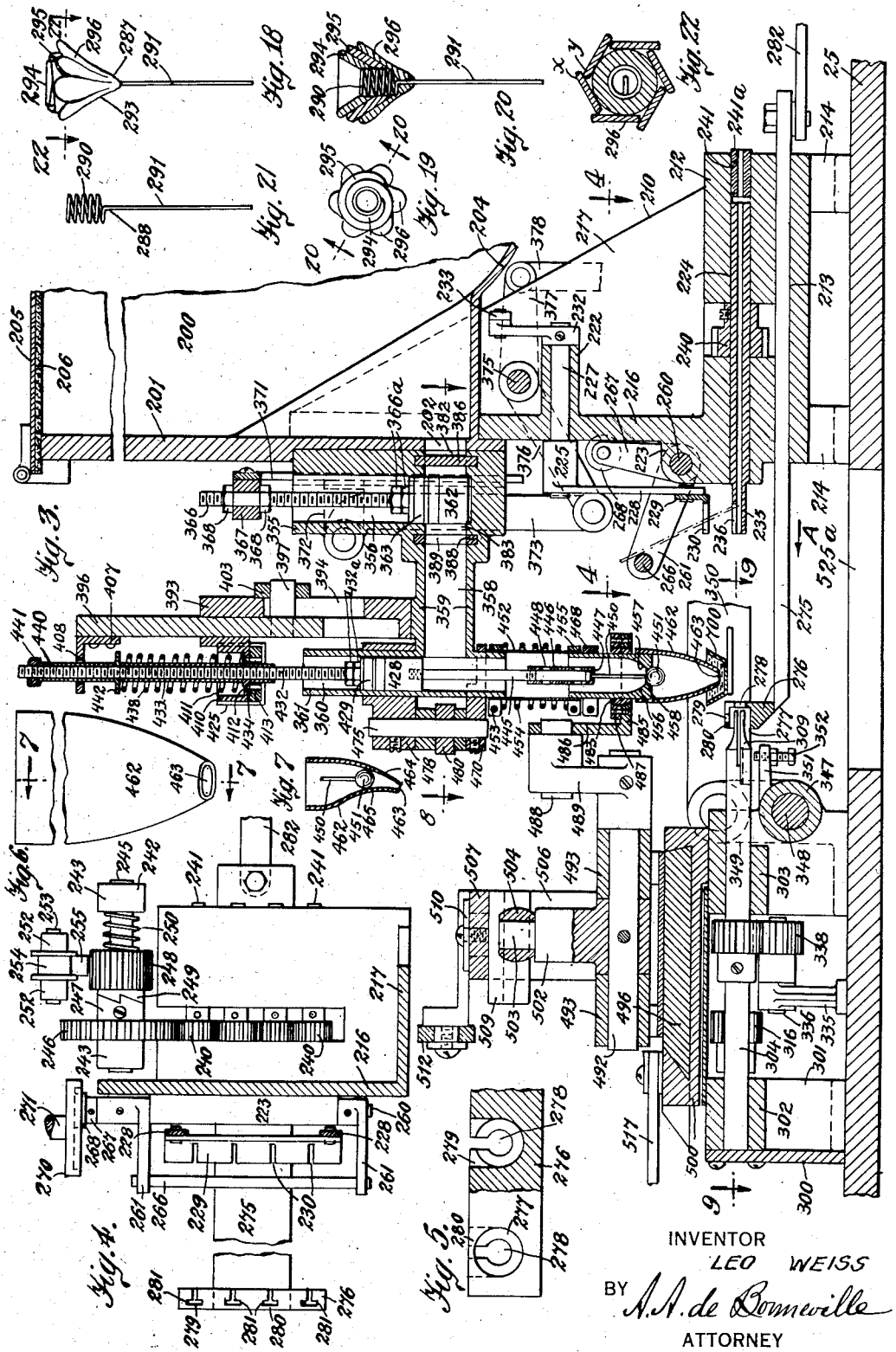
INVENTOR
*LEO WEISS*
BY *A.A. de Bonneville*
ATTORNEY April 14, 1936.    L. WEISS    2,037,186
APPARATUS FOR MAKING CANDLE HOLDERS
Filed June 29, 1934    3 Sheets-Sheet 3
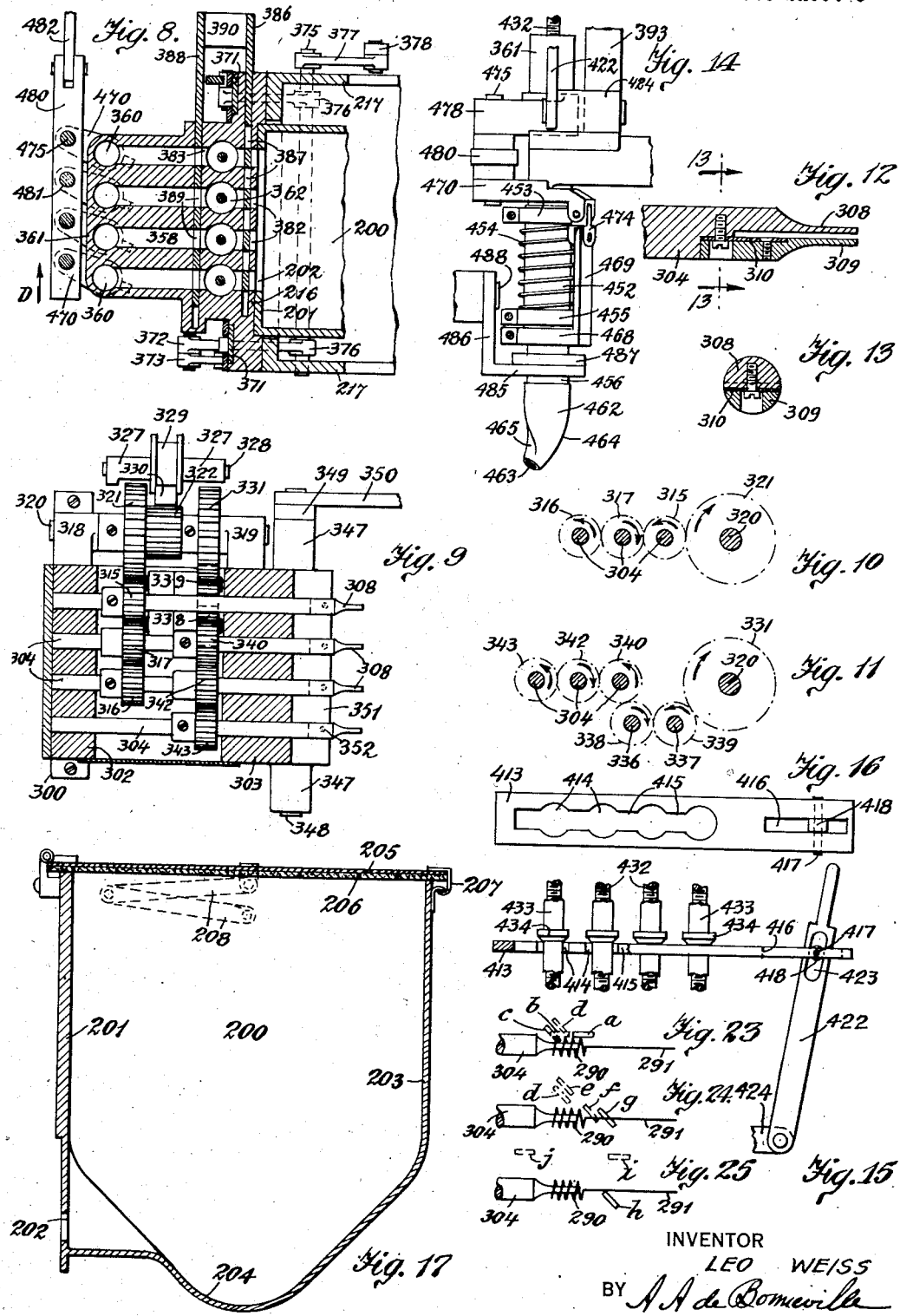
INVENTOR
LEO WEISS
BY A. A. de Bonneville
ATTORNEY Patented Apr. 14, 1936

2,037,186

UNITED STATES PATENT OFFICE 2,037,186

APPARATUS FOR MAKING CANDLE HOLDERS

Leo Weiss, Brooklyn, N. Y.

Application June 29, 1934, Serial No. 733,068

13 Claims. (Cl. 41—1)

This invention relates to apparatus for making candle holders.

The object of the invention is the production of apparatus for producing a ribbon of plastic material, like icing and positioning the said material in the form of a flower around the helical socket portion of a wire frame.

The second object of the invention relates to apparatus for producing ribbons from plastic material contained in a reservoir, and maintaining the material out of contact with the air until the ribbon has been formed.

The third object is the production of a ribbon of plastic material, which hardens with exposure to the air, and discharging said ribbon from a nozzle at high speed.

The fourth object is the production of cylinders having reciprocating pistons and piston rods for plastic material, said material to a certain extent hugging said piston rods and thereby enhancing the speed of discharge of said material from the cylinders.

The fifth object is the production of cylinders having pistons for the discharge of plastic material and means for maintaining a check valve coacting with said cylinders closed, when the pistons are not discharging the material.

The sixth object of the invention is the production of apparatus for the discharge of plastic material and means of sealing said material with water or water vapor when the apparatus is not in operation.

In the drawings Fig. 1 represents a top plan view in partial section of the apparatus for making the candle holders; Fig. 2 shows a partial enlarged section of Fig. 1 on the line 2—2; Fig. 2a shows a partial left hand side view of Fig. 2; Fig. 3 represents an enlarged section of Fig. 1 on the line 3—3; Fig. 4 indicates a section on the line 4—4 of Fig. 3 on a reduced scale; Fig. 5 shows a left hand side view partly in section of a portion of Fig. 3; Fig. 6 indicates an enlarged fragmentary portion of the discharge nozzle of Fig. 3; Fig. 7 shows a section of Fig. 6, on the line 7—7; Fig. 8 indicates a section on a reduced scale of Fig. 3 on the line 8—8; Fig. 9 shows a section on a reduced scale of Fig. 3 on the line 9—9; Fig. 10 represents a diagrammatic view of one train of gears indicated in Fig. 9; Fig. 11 shows a diagrammatic view of a second train of gears of Fig. 9; Fig. 12 is an enlarged vertical sectional elevation of a fragmentary portion of Fig. 3; Fig. 13 shows a section of Fig. 12 on the line 13—13; Fig. 14 indicates a fragmentary portion of Fig. 3 in full lines; Fig. 15 represents an enlarged side view of a fragmentary portion of Fig. 1; Fig. 16 shows a top view of Fig. 15; Fig. 17 indicates a section on an enlarged scale of a portion of Fig. 1; Fig. 18 shows an enlarged elevation of a complete candleholder; Fig. 19 is a top view of Fig. 18; Fig. 20 represents a section of Fig. 19 on the line 20—20; Fig. 21 indicates an elevation of the wire frame holder; Fig. 22 shows a section of Fig. 18 on the line 22—22; Figs. 23, 24 and 25 diagrammatically indicate different steps in producing the flower of the candleholder.

Referring to Figs. 1, 3 and 17 the reservoir for the material to be handled which may be icing or other semi-fluid or plastic material is indicated with its appurtenances and is designated in its entirety by the numeral 200. The reservoir comprises the front wall 201 having the elongated discharge opening 202. The said reservoir is also shown with the rear wall 203 and the bottom wall 204. A hinged cover 205 is provided with an absorbent sheet of material 206. A spring latch 207 detachably locks the cover 205 in place. A toggle joint comprising the links 208 is interposed between the body portion of the reservoir and its cover 205.

A supporting bracket is designed in its entirety by the numeral 210. The bracket 210 comprises the body portion 212 having longitudinal openings 213, and is provided with the feet 214, which are supported upon and fastened to the main platform 25. From the body portion 212 extends the vertical front wall 216, and side walls 217 connect the body portion 212 and the wall 216. The wall 216 has integral therewith a pair of journal hubs one of which is shown at 222. A journal hub 223 is also integral with the front wall 216. In the body portion 212 are openings 224. It will be noted that the reservoir 200 is supported upon the wall 216.

An initial bending device is designated in its entirety by the numeral 225. The device 225 comprises a pair of shafts one of which is shown at 227. The said shafts are supported in the hubs 222. From the shafts 227 depend the arms 228, which at their lower ends are connected by the angle iron guide 229 having the guide slots 230. To one of the shafts 227 is fastened the crank arm 232 and the latter has pivoted thereto the link 233, which is moved by means not shown. In the body portion 212 are journaled a plurality of guide spindles 235, having the guide slots 236, one for each of the wires 55, 56, 57 and 58 operated upon. To each of the spindles 235 is fastened a spur gear 240. Shearing bushings 241, for shearing means not shown, having the shearing ends 241a are tightly secured in the openings 224.

Referring to Figs. 3 and 4, a bending device is designated in its entirety by the numeral 242. The bending device comprises a pair of journal brackets 243, which extend up from the main platform 25. A shaft 245 has its ends journaled in the journal brackets 243. A large spur gear 246 is fastened to the shaft 245 and has integral therewith the clutch member 247. A spur gear 248 is carried on the shaft 245 and has integral therewith the clutch member 249, which is adapted to engage the clutch member 247. A spring 250 encircles the shaft 245 and bears between the journal bracket 243 and the spur gear 248. A pair of journal brackets 252 extend up from the platform 25 and have journaled therein the shaft 253, to which is fastened the flange roller 254. A rack bar 255 is interposed between the roller 254 and the spur gear 248 with which it is in mesh. In the journal hub 223 is journaled the shaft 260, to which is fastened a pair of arms 261. In the said arms is journaled the bending shaft 266. To one end of the shaft 260 is fastened the arm 267 which latter has journaled thereto the roller 268. A grooved cam 270 on the shaft 271 coacts with the roller 268. The said rack bar 255 is vertically reciprocated by means not shown. With the upward movements of the rack bar 255, the spur gear 248 turns and thereby the large spur gear 246 transmits rotation to the spur gears 240. With the rotations of the spur gears 240 the guide spindles 235 are turned. Equal lengths of the wires 55, 56, 57 and 58 enter the shearing bushings 241 and are pushed therethrough by means not shown. When the wires leave the spindle 235, the bending shaft 266 has previously been positioned below the guide spindles 235. While the lengths of wires are pushed forwardly, the bending shaft 266 moves upwardly and bends the wires 55 to 58 as indicated in dotted lines in Fig. 3. The said bending occurs at the inner ends of the slots 236.

In the body portion 212 is indicated the slide plate 275, which at its front end has integral therewith a bracket 276. The said bracket has formed therewith a plurality of cup shaped housings 277, each of which is provided with the opening 278 in its vertical wall and the T shaped opening 279 having the wall 280 and the guide walls 281 in its roof which join with the opening 278. A link 282 is pivoted to the slide plate 275. The link 282 is actuated by means not shown, to horizontally reciprocate the slide plate 275.

Referring to Figs. 18 to 22 the wire frame 288 of the candle holder 287 is shown to comprise the helical socket portion 290 from which extends the shank 291. When the slide plate 275 positions the housings 277 with their openings 278 around the forward ends of the spindles 235, the walls 280 are in line with the inner ends of the slots 236, and the wires are further bent to vertical positions. While the walls 280 are bending the wires upwardly, they also position said wires in the guide slots 230. When the housings 277 with their walls 280 reach the end of their stroke in a direction opposite the arrow A, Fig. 3, the angle iron guide 229 begins to horizontally reciprocate and initially bends the wires around the forward ends of the spindles 235. The guide plate 229 in this instance bends a pair of the wires in one direction and during the opposite movement of the plate 229 releases the said wires and bends another pair of wires in an opposite direction. At the same time each pair of the spindles 235 are rotating at a speed slower than the reciprocations of the plate 229 in directions opposite to the bending of the wires. The purpose of the steps just described is to reduce the power required to form the helical socket portions 290 of the frames 288.

As the spindles 235 turn the slide plate 275 simultaneously moves forwardly in the direction of the arrow A. The vertical legs of the wires bear against one of the walls 281 of the T shaped openings 279, and are thereby carried forwardly. At the same time the helical socket portions 290 of the wire frames are formed around the forward ends of the spindles 235.

It will be noted that a portion of each length of wire remains within the bore of its guide spindle 235 while its helical socket portion is being formed.

Referring to Figs. 18 to 22 each complete candleholder 287 is indicated to comprise the wire frame 288, as already described, having the helical socket portion 290 and the shank 291. Around the helical socket portion 290, is indicated the bud of a flower 293 comprising the inner winding 294 and the outer winding 295, of a ribbon of icing material, or the like. Around the said windings 294 and 295 are indicated the petals 296 of the flower. It will be understood that the windings 294 and 295 adhere to each other and the petals 296 adhere to the said windings. The windings adhere to the socket portion 290 and the lower ends of the petals 296 adhere to the shank 291.

Referring to Figs. 1, 3, 9 to 13, the flower forming device of the apparatus is designated in its entirety by the numeral 300. The forming device 300 comprises the supporting frame 301 having the row of journal bearings 302 and the row of journal bearings 303. In each pair of bearings of said rows are journaled the spindles 304. Each of the spindles 304 has provided therefor an expansion support. Each expansion support consists of the fixed tapered semi-cylindrical portion 308 which is a continuation of the spindle 304. A second tapered and movable semi-cylindrical portion indicated at 309 is normally spaced from the portion 308. A plate spring 310 has one end fastened to the spindle 304 and its other end is fastened to the portion 309. By virtue of the construction just described, the portion 309 is in movable relation to the portion 308, and thereby the outer diameter of the said portions 308 and 309 is variable. To the spindles 304 are fastened the driven gears 315 and 316. An idler gear 317 is supported on one of the spindles 304, and is in mesh with the driven gears 315 and 316. Supplementary journal bearings 318 and 319 are integral with the forming device 300, and have journaled therein the shaft 320. On the shaft 320 is fastened the driving gear 321, which meshes with the gear 315. A spur gear 322 is also fastened to the shaft 320. A pair of journal bearings 327 extend from the platform 25. A shaft 328 is journaled in the journal bearings 327 and has fastened thereto the flange roller 329. A rack bar 330 is interposed between the roller 329 and the gear 322 with which latter it is in mesh. Means not shown are provided for reciprocating the rack bar 330. On the shaft 320 is fastened a third gear 331. A journal bracket 335 extends from the platform 25 and has fastened therein the studs 336 and 337. An idler gear 338 is supported on the stud 336 and an idler gear 339 in mesh with the gear 338 is supported on the stud 337. A driven gear 340 is fastened to one of the spindles 304 and is in mesh with the idler gear 338. An idler gear 342 on one of the spindles 304, is in mesh with the gear 340. A driven gear 343 fastened to one of the spindles 304, is in mesh with the gear 342. A pair of journal brackets 347 are integral with the forming device 300, and have journaled therein the shaft 348. An arm 349 has one end fastened to the shaft 348. A link 350 is pivoted to the upper end of the arm 349 and rocks the latter, by means not shown. A plate 351 is fastened to the shaft 348. Adjusting screws 352 with lock nuts extend from the plate 351.

Referring to Figs. 1, 3, 6, 8 and 14 to 16 which also refer to the flower forming device will now be considered. To the wall 201 of the reservoir 200 is fastened a multiple cylinder housing indicated in its entirety by the numeral 355. The housing 355 in this instance is shown with the four cylindrical chambers 356. Conduits 358 having the walls 359 extend from the housing 355. Each conduit 358 joins with a cylindrical chamber 360 having the wall 361.

In each of the chambers 356 is indicated the piston 362 having the packings 363. A threaded piston rod 366 extends from each piston 362 and is provided with the nuts 366a to adjust the packings 363. A cross head 367 connects the upper ends of the piston rods 366. Lock nuts 368 on the piston rods 366 coact with the cross head 367. The lock nuts 368 may bear against the upper and lower faces of the cross head 367 or may be spaced therefrom, to vary the strokes of the pistons 362. A pair of slides 371 extend from the cross head 367. A bracket 372 extends from each of the slides 371. A link 373 for each bracket 372 has its upper end pivoted thereto. A shaft 375 is journaled in the side walls 217. Levers 376 connect the shaft 375 and the lower ends of the links 373. An arm 377 extends from the shaft 375 and has connected thereto a link 378 which latter is moved by means not shown to reciprocate the pistons 362. The cylinder housing 355 at its lower end is provided with the inlet openings 382 and the outlet openings 383. An inlet valve plate 386 having the openings 387, and an outlet valve plate 388 having the openings 389, are slidably positioned in the housing 355. A spacing block 390 see Fig. 1 having the projection 391 connects the valve plates 386 and 388. A link 392 extends from the projection 391, to reciprocate said valve plates. A support 393 having the opening 394 is supported upon the walls 359. A slide plate 396 bears against the support 393 and has extending therefrom the pin 397 which extends through the opening 394. A combined swivel and sliding block 403 is supported on the pin 397. A lever 404, see Fig. 1 has one end supported on the block 403, and the other end of the lever 404 is pivoted to the link 405, which is moved by means not shown.

To the upper end of the slide plate 396 is secured the guide angle 407 having a plurality of openings 408.

Referring particularly to Figs. 3, 15 and 16, a cross head 410 having a plurality of cup shaped openings 411 is fastened to the slide plate 396. An opening 412 is shown at the lower end of each cup shaped opening 411. An adjusting slide 413 bears up against the cross head 410, and has shown therein the plurality of cylindrical shaped openings 414, connected by the contracted openings 415. An opening 416, is shown in the slide 413. A pin 417 in the slide 413 extends through the opening 416 and has journaled thereon the roller 418. An operating handle 422 has an opening 423 at its upper end in which the roller 418 actuates.

The lower end of the handle 422 is pivoted to the extension 424 of the support 393. Straps 425 extending from the cross head 410 support the slide 413.

A piston 428 reciprocates in each cylindrical chamber 360 and is provided with the packings 429. A threaded piston rod 432 extends from the upper end of each piston 428. Nuts 432a on the piston rod 432 are provided to adjust the packing 429. A sleeve 433 encircles each piston rod 432 and has integral therewith adjacent to its lower end the flange 434.

A helical spring 438 encircles each sleeve 433 and its lower end bears against the bottom wall of the cup shaped opening 411.

A sleeve 440 encircles the piston rod 432 and is indicated with a hexagonal nut 441 and the flange 442, which bears on the top end of the spring 438.

Referring to Figs. 3, 15 and 16, it will be noted that when the adjusting slide 413 is positioned with its openings 414 coaxial with the sleeves 433, the latter can pass through said openings when the slide plate 396 reciprocates and the piston rods 433 remain stationary. When the slide plate 413 is moved so that its contracted openings 415 are in line with the flanges 434 of the sleeves 433 and the slide plate 396 reciprocates, then the piston rods 432 are also reciprocated.

A flexible piston rod 445 extends from the lower end of each piston 428. To the lower end of the piston rod 445 is detachably connected the sleeve 446, having the lower wall 477 with an opening. Openings 448 are made in the cylindrical wall of the sleeve 446. A valve rod 450 having a head extends from the sleeve 446 and at the bottom end of the valve rod 450 is indicated the spherical check valve 451.

Referring particularly to Figs. 3 and 14, to the lower end of each wall 361 is detachably connected a flexible conduit 452 by means of a clamp 453. A helical spring 454 encircles the conduit 452 between the clamps 453 and 455 to which latter it is fastened. The clamp 455 at the lower end of the conduit 453 clamps the metallic sleeve 456 thereto.

The sleeve 456 is shown with the lower curved wall 457, having the discharge port and seat 458 for the valve 451.

A detachable discharge nozzle 462 has its upper end connected to the sleeve 456. The said nozzle has the elliptical discharge opening 463 at its lower end. The nozzle 462 is shown with the curved wall 464 and the reversed curved wall 465, to direct the discharge of the icing therefrom and to lead the said icing to the helical socket portion 290 and the shank 291 of the frame of the candle holder.

A clamp 468 engages the upper portion of each sleeve 456 and has integral therewith the vertical member 469. A swivel is indicated at 470, which surrounds the lower extension of each wall 361 and a universal joint 474 is interposed between the elements 469 and 470. A pin 475 has its lower end fastened to each swivel 470. To the upper end of each pin 475 is fastened the supporting swivel 478 which latter surrounds the upper extension of the wall 361. An operating bar 480, see Figs. 1, 3 and 8, is indicated with a plurality of openings 481 which encircle the pins 475. A link 482 has one end pivoted to the bar 480 and is reciprocated by means not shown. Ball and socket joints are each indicated having the inner member 483 which encircles the sleeve 456. The outer portion of each joint consists of the angle support having the members 485, and 486. To the member 485 is bolted the top plate 487. From the member 486 extends a pair of pins 488 which are journaled to the upper hubs of the levers 489.

A lower hub of one of the levers 489 is fastened to the shaft 492, which is journaled in the hubs 493, of the slide 496. The lower hub of the other lever 489 is swiveled to the stud 497 extending from the hub 498 of the slide 496. The slide 496 is guided in the housing 500 and the latter is fastened to the supporting frame 301. An arm 502 is fastened to the shaft 492 and from its upper end extends a pin 503 for the roller 504. A pair of projections 506 extend from the housing 500 and slidably support the reciprocating slide bar 507 having the openings 508. A pair of angular shaped guide plates 509 extend from the lower face of the slide bar 507 and contact with the roller 504. Guide plates 510 are fastened to the projections 506 for the slide bar 507. A link 512 is pivoted to the slide bar 507 to reciprocate the same by means not shown.

A link 517 is pivoted to the slide 496 to reciprocate the latter by means not shown.

Referring particularly to Fig. 3, after the frames 288 have been formed with their helical socket portions 290, they are supported on the guide spindles 235. Next the slide plate 275 moves in the direction of the arrow A, Fig. 3, and the helical socket portions 290 in the housings 277 are located around the forward ends of the spindles 304. Before the portions 290 are located around the spindles 304, the screws 352 by virtue of the swing of the plate 351, locate the screws 352 to bear against the movable cylindrical portions 309 to reduce the outer diameters of the portions 308 and 309 to freely receive the helical socket portions 290.

The screws 352 now separate from guide spindles 304, and the spindles 304 tightly support the helical socket portions 290 of the frames 288, by reason of the separation of the portions 309 from the portions 308, resulting from the tension of the springs 310. The slide plate 275 now moves in a direction opposite to the arrow A, the frames 288 remaining on the spindles 304 and the foregoing steps are repeated to form another lot of wire frames 288. The icings are discharged from the nozzles 462 as follows:

The icings are located in the reservoir 209 and portions of the same are drawn from the said reservoir by the upward movements of the pistons 362, by means not shown.

It is to be understood that the openings 387 of the valve plate 386 are in their open position and that the openings 389 of the valve plate 388 are in their closed position at this instant. At the end of the upstroke of the pistons 362, the valve plate 386 is positioned with its openings in their closed position and the valve plate 388 is positioned with its openings in their open position. The pistons 362 are now moved downwardly and from their upper positions and the icings are forced into the conduits 359 and from the latter enter the chambers 360, under pressure below the pistons 428, which latter are at the upper ends of their strokes. It will be noted that the upward movement of the slide plate 396 causes the pistons 428 to move upwardly, and by this means each spherical check valve 451 is closed on its seat, the tension of the springs 438 securing tight locking contact of the valves 451 on their seats.

The pistons 428 now move downwardly and the icings in the cylindrical chambers 360 automatically open the check valves 451, and the latter descend into the discharge nozzles 462 to the position shown in Fig. 7. Next the icings enter the nozzles 462 and are discharged from the same through the openings 463 in the form of ribbons elliptical in cross-section.

It will be noted that the icings that accumulate in the sleeves 446 will be discharged therefrom through the openings 448, when the check valves 451 are in the position shown in Fig. 7. The curvature of the nozzles 462, see Fig. 7 directs the icing toward the wire frames 288.

Before the pistons 428 begin to descend the discharge nozzles 462 are positioned with their discharge openings 463 adjacent to and over the helical socket portions 290 as indicated at a, Fig. 23, by means of the movements of the slide 496 and the angle supports having the members 485 and 486 in the direction of the arrow B, Fig. 1. The pistons 428 now begin their downward strokes. The spindles 304 now turn to rotate the frames 388 to begin forming the inner windings 294 from the ribbons discharged from the openings 463. Next the slide 496 moves in a direction opposite the arrow B, Fig. 1, and at the same time the slide bar 507 moves in the direction of the arrow C, to locate the discharge openings 463 in the position indicated at b, Fig. 23.

The discharge nozzles 462 are partially turned on their vertical axes, by means of the operating bar 480, and each discharge nozzle 462 takes the position indicated at c, Fig. 23. While the frames 288 are still being rotated the slide bar 507 positions the nozzles 462 with their openings 463, as indicated at d, Figs. 23 and 24. The second or outer winding 295 of the buds of the flowers are now formed over the inner windings 294, by the continuation of the rotation of the frames 288 and the descent of the pistons 428. After the second windings 295 are completed the slide bar 507 with its coacting elements locate the discharge nozzles 462 with their openings 463 to the positions shown at e, Fig. 24. Next the nozzles 462 are reciprocated in directions making angles with the shanks 291 of the frames 288, as indicated at e to f, Fig. 24. The said reciprocations of the nozzles 462 result from the reciprocations of the slide 496 and the coacting of its adjacent elements, and the movements of the slide bar 507 with its coacting elements. The combination of the movements for each double reciprocation of the nozzles 462 causes the discharge openings 463 to take an elliptical path, by which the petals 296 are made. By means of the just before described movement of the nozzles 462, the petals 296 are positioned relatively to each other as plainly shown in Fig. 22, with the end x on one petal overlapping the end y of the adjacent petal as shown.

Before the last petal of each flower is finished, the slide bar 507 moves the nozzles 462 with their openings 463 to the position g, Fig. 24.

When the last petal 296 of each flower 293 is about one half finished, the pistons 428 begin to rise, which sucks portions of the icings in the nozzles 462 into the chambers 360. By this means the ribbons of the icings are cut off at the discharge openings 463 of the nozzles 462.

Next the nozzles 462 with their openings 463 move in close proximity over the shanks 291, as indicated at g, Fig. 24, and positions said openings as indicated at h, Fig. 25, thereby carrying and brushing off the remaining portions of the cut off ribbons of icing at the shanks 291 to complete the flower of each holder.

The nozzles 462 are now moved to the position as indicated at i, Fig. 25, by means of the slide bar 507 and its coacting elements, and at the same time the operating bar 480 moves in a direction opposite the arrow D, Fig. 8, to position the openings 463 of the nozzles 462 parallel to the shanks 291, as indicated at i.

This is for the purpose of clearing pairs of finished candleholders 287 from the discharge nozzles 462.

To the lower face of the main platform 25 of the apparatus see Figs. 2, 2a, and 3 is fastened the journal bracket 525 adjacent to the openings 525a in said platform. In the bracket 525 is journaled the oscillating shaft 526. The longitudinal axis of the shaft 526 is in a vertical plane indicated by the line 2b, 2b, of Fig. 1. To the shaft 526 is fastened a swinging frame designated in its entirety by the numeral 528. The frame 528 comprises the pair of hubs 529 and from each of the latter extends an arm 530, which are connected by the rib 531. Four springs are shown, each having the vertical leg 532 and the horizontal leg 533. The legs 533 are supported upon the rib 531 and have bearing thereon the plate 534, which latter is detachably connected to the rib 531. On the arms 530 is slidably supported the reciprocating angle shaped sliding bar 538, having the vertical leg 539 and the horizontal leg 540. In the leg 539 are shown openings 542 and in the horizontal leg 540 are indicated the slotted openings 543. From the sliding bar 538 extends the pivot 544, on which is journaled the roller 545. An angle slide 548 has its vertical leg 549 bearing against one end of the roller 545. Plates 550 are fastened to the arms 530, to hold the sliding bar 538 in place. To the arms 530 and the rib 531 is fastened the plate 552 having the extensions 553 integral therewith. To each extension 553 is fastened a gripping jaw 554. The upper end of each jaw contains the V shaped gripping member 555. Each of the members 555 has indicated therein the V shaped seat 566.

When the candle holders 287 have been completed the gripper frame 528 grips the shanks 291 of said candleholders 287, which latter are positioned on the spindles 304. The gripping is accomplished by the vertical spring legs 532 and their coacting elements. The legs 532 bear against the shanks 291 of the frames 288, and the latter bear against the seats 556 of the V shaped gripping members 555.

The gripping of the shanks 291 of the candle holders is accomplished as follows: The angle slide 548 moves in the direction of the arrow, Fig. 2a and its vertical leg 549 bears against the roller 545, which moves the angle shaped sliding bar 538. At the same time the vertical spring legs 532 bear against the side walls 543a of the openings 543 of the slide bar 538 and the shanks 291 of the frame are tightly gripped in the seats 556 of the jaws. Next the movable portions 309 of the spindles 304 approach the portions 308, by means of the screws 352 and their coacting elements, and the socket portions 290 of the frames 288 are released. After the portions 290 are released, the gripper frame 528 with its gripped candleholders swings downwardly to a horizontal position to locate the candleholders in vertical positions to locate them in supports not shown.

When the apparatus is not in operation troughs 700, Fig. 3, containing water are positioned below the discharge nozzles 462, to prevent the hardening of the plastic material in the discharge openings 463. Various modifications may be made in the invention and the present exemplification is to be taken as illustrative and not limitative thereof.

Having described my invention I claim:

1. In an apparatus the combination of a plurality of housings, each having the helical socket portion of a frame for a candleholder therein, the shank for each socket portion extending from each housing, a rotating spindle coacting with each housing, an expansion support comprising a pair of portions for each spindle, a flexible element interposed between said portions of each spindle, an element to contact with said supports to close them, means to locate the said housings with said socket portions on said expansion supports, means to remove said element from said supports to clamp the socket portions thereon, and means to remove said housings from said socket portions.

2. In an appaartus of the character described the combination of a reservoir, having an opening in one of its walls a cover hinged to the reservoir, a moist absorbent sheet of material fastened to the inner face of said cover, a multiple cylinder housing fastened to said reservoir, coacting with its opening and having a plurality of cylindrical chambers, a piston in each of said chambers, means to reciprocate said pistons, an inlet valve plate with openings and an outlet valve plate with openings for said chambers, means to reciprocate said valve plates, a conduit extending from the lower end of each cylindrical chamber, a cylindrical chamber at the other end of each conduit, a piston in each of the latter cylindrical chambers, a discharge nozzle for each of the latter cylindrical chambers, and a detachable trough containing water under each nozzle.

3. In an apparatus of the character described the combination of a reservoir for a material to be operated upon, a multiple cylinder housing extending from said reservoir having a plurality of cylindrical chambers, a piston in each of said chambers, a threaded piston rod extending from each piston, a cross-head connected to the upper ends of the threaded piston rods, means to reciprocate the crosshead, adjustable lock nuts on each piston rod on opposite sides of the crosshead and adapted to be spaced therefrom to vary the strokes of the pistons, an inlet valve plate and an outlet valve plate for said chambers, and means to reciprocate said valve plates.

4. In an apparatus of the character described the combination of a reciprocating slide plate, a plurality of cylinders adjacent to the slide plate, a crosshead extending from the slide plate, a piston in each cylinder, a piston rod for each piston actuated by the crosshead, a discharge nozzle for each cylinder and means coacting with the crosshead to hold the piston rods stationary during the reciprocations of the crossheads.

5. In an apparatus of the character described the combination of a reciprocating slide plate, a guide angle having openings, at the upper end of the slide plate, a crosshead having a plurality of cup shaped openings spaced from the guide angle, an adjusting slide bearing up against said crosshead, said adjusting slide having a plurality of cylindrical openings connected by contracted openings, means to reciprocate the adjusting slide, a plurality of cylinders below the crosshead, a piston in each cylinder, a threaded piston rod for each piston extending through the guide angle, crosshead and adjusting slide, a sleeve having a flange at its lower end in threaded engagement with the upper end of each threaded piston rod, a second sleeve in threaded engagement with the piston rod and having a projecting flange at its lower end and below the other sleeve thereof, a helical spring encircling each piston rod with its upper end bearing against the flange of the sleeve at the upper end of the piston rod and its lower end bearing against the lower wall of its cup shaped opening to automatically raise the pistons.

6. In an apparatus of the character described the combination of a reservoir, a multiple cylinder housing having cylindrical chambers extending from the reservoir, and coacting with an opening therein, a plurality of reciprocating pistons in the chambers, a conduit extending from each chamber, a support extending up from the walls of the conduits, a reciprocating slide plate guided on said support, a guide angle having openings at the upper end of the slide plate, a crosshead having a plurality of cup shaped openings spaced from the guide angle and fastened to the slide plate, an adjusting slide bearing up against said crosshead, said adjusting slide having a plurality of cylindrical openings connected by contracted openings, means to reciprocate the adjusting slide, a cylinder extending from each conduit, a piston in each of the latter cylinders, a threaded piston rod for each of the latter pistons extending through the guide angle, crosshead and slide plate, a sleeve having a flange at its lower end and a nut at its upper end in threaded engagement with the upper end of each threaded piston rod, a second sleeve in threaded engagement with each threaded piston rod having a projecting flange at its lower end below the other sleeves thereof, the flanges of the latter sleeve adapted to reciprocate through the cylindrical openings of the adjusting slide and stopped when in line with its contracted openings, a helical spring encircling each threaded piston rod with its upper end bearing against the flange at the upper end of the threaded piston rod and its lower end bearing against the lower wall of the cup shaped opening and a discharge nozzle for each of the latter cylinders.

7. In an apparatus of the character described the combination of a plurality of cylinders, a piston in each cylinder, means to reciprocate the pistons, a flexible piston rod extending from each piston, a check valve slidably connected to the lower end of each flexible piston rod, a sleeve in flexible relation to each cylinder, a discharge port and seat in each of said sleeves for each check valve, a curved discharge nozzle for each of the sleeves to direct the flow of material passing therethrough and means to simultaneously position each discharge nozzle in different angular positions relatively to its longitudinal axis.

8. In an apparatus of the character described the combination of a plurality of cylinder, a piston in each cylinder, means to reciprocate the pistons, a flexible piston rod extending from each piston, a check valve slidably connected to the lower end of each flexible piston rod, a flexible conduit having its upper end connected to the lower end of each cylinder, a metallic sleeve having its upper end clamped to the lower end of each flexible conduit, a discharge port and seat at the lower end of each metallic sleeve for said spherical check valves, a discharge nozzle having a discharge opening at the lower end of each metallic sleeve, and means to simultaneously swing each flexible conduit to locate the discharge openings of the discharge nozzles in different radial positions relatively to their longitudinal axes.

9. In an apparatus of the character described the combination of a plurality of cylinders, a piston in each cylinder, a piston rod extending from the upper end of each piston, means to reciprocate the piston rods with their pistons, a flexible piston rod depending from each piston, a sleeve having a bottom wall and openings in its cylindrical wall depending from each flexible piston, a valve rod having a head extending through the bottom wall of each sleeve, a spherical check valve at the lower end of each valve rod, a flexible conduit having its upper end encircling the lower end of each cylinder, a metallic sleeve having its upper end connected to each flexible conduit, a discharge port and seat at the lower end of each metallic sleeve for said spherical check valves, a clamp encircling the upper end of each flexible conduit, a clamp encircling the lower end of each flexible conduit to connect its metallic sleeve thereto, a spring encircling each flexible conduit having its ends connected to the said clamps, a discharge nozzle extending from the lower end of the metallic sleeve, a second clamp at the upper end of the metallic sleeve, a vertical member extending upwardly from the latter clamp, a pin supported in the upper end of said vertical member, a link having one end supported on the pin, a swivel above the upper end of the link and rotatively supported on the lower end of each cylinder, a pin connecting the swivel and the upper end of the link, a vertical pin extending from each swivel and a supporting swivel fastened to the upper end of each vertical pin and rotatively connected to the upper end of each cylinder, means connected to said vertical pins to simultaneously swing the swivel and vertical pins and thereby simultaneously swing said flexible conduits with their metallic sleeves and discharge nozzles.

10. In an apparatus of the character described the combination of a plurality of cylinders, a reciprocating piston in each cylinder, a sleeve in flexible relation with each cylinder, a discharge nozzle extending from each sleeve, a support adjacent to the sleeves, a ball and socket joint interposed between the sleeve and said support, a pair of reciprocating slides, having their longitudinal axes making angles with each other, guided in the apparatus and connections between each slide and said support.

11. In an apparatus of the character described the combination of a plurality of cylinders, a reciprocating piston in each cylinder, a sleeve in flexible relation with each cylinder, a discharge nozzle extending from each sleeve, an angle support adjacent to the sleeves, a ball and socket joint interposed between the sleeves and said angle support, a pair of pins fastened to the angle support, the upper ends of levers journaled to said pins, a supporting frame adjacent to said cylinders, a housing fastened to said frame, a slide guided in the housing, means to reciprocate the slide, hubs extending from the slide, a shaft journaled in said hubs, the lower hub of one of said levers fastened to said shaft, a hub extending from said slide, a stud extending from said hub, the lower end of the other lever swiveled on said stud, an arm fastened to the shaft, a pin at the upper end of the arm, a roller journaled on the latter pin, projections extending from the housing, a reciprocating slide bar supported on the projections, angle shaped guide plates extending from the lower face of the latter slide bar, said angle plates contacting with said roller, and a link pivoted to the latter slide bar to reciprocate the same.

12. In an apparatus of the character described, the combination of a reservoir having an opening in one of its walls, a multiple cylinder housing fastened to said reservoir coacting with its opening and having a plurality of cylindrical chambers, a piston in each of said chambers, means to reciprocate said pistons, controlled inlets and outlets for said chambers, a conduit extending from the lower end of each cylindrical chamber, a cylindrical chamber at the other end of each conduit, a piston in each of the latter cylindrical chambers, means to reciprocate the latter pistons, a sleeve having a discharge port and seat at its lower end, a check valve in each sleeve coacting with its discharge port and seat, and a nozzle extending from each sleeve, the pistons of the multiple cylinder housing when descending producing an initial pressure in all the cylindrical chambers when said check valves are on their seats.

13. In an apparatus of the character described, the combination of a reciprocating slide plate, a cylindrical chamber adjacent to the slide plate, a cross head extending from the slide plate, a piston in the cylindrical chamber, a piston rod extending from the upper end of the piston actuated by the cross head, a flexible piston rod extending from the lower end of the piston, a flexible connection extending from said cylindrical chamber, a sleeve supported at the lower end of the flexible connection and having a discharge port, a check valve for said port in suspended relation with said flexible piston rod and a discharge nozzle extending from said sleeve.

LEO WEISS.